United States Patent
Cicala et al.

(10) Patent No.: US 7,035,723 B2
(45) Date of Patent: Apr. 25, 2006

(54) METHOD FOR RAPID DATA TABLE INITIALIZATION

(75) Inventors: Stephen Cicala, Dearborn Heights, MI (US); Kurt Nickerson, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 10/605,701

(22) Filed: Oct. 21, 2003

(65) Prior Publication Data

US 2005/0085981 A1 Apr. 21, 2005

(51) Int. Cl.
*G06F 17/00* (2006.01)
*G06F 19/00* (2006.01)

(52) U.S. Cl. .................. 701/54; 701/57; 707/101; 707/102

(58) Field of Classification Search ............... 701/54, 701/57; 707/101, 102, 103 Y
See application file for complete search history.

(56) References Cited

U.S. PATENT DOCUMENTS

| | | | |
|---|---|---|---|
| 6,212,524 B1 * | 4/2001 | Weissman et al. | 707/101 |
| 6,339,769 B1 * | 1/2002 | Cochrane et al. | 707/2 |
| 6,694,310 B1 * | 2/2004 | Yu et al. | 707/4 |

* cited by examiner

*Primary Examiner*—Gertrude A. Jeanglaude
(74) *Attorney, Agent, or Firm*—David B. Kelley; Brooks & Kushman

(57) ABSTRACT

The present invention provides a fast learn algorithm for quickly providing data to a data table and a controller. Existing data is considered, such that information gathered from prior events is not arbitrarily overwritten. An error is determined for a first data cell based on current operating conditions and the occurrence of an event. Weighting factors are then applied to data cells removed from the first data cell, such that some or all of the data cells in the data table can be populated based on the data input into the first data cell.

26 Claims, 5 Drawing Sheets

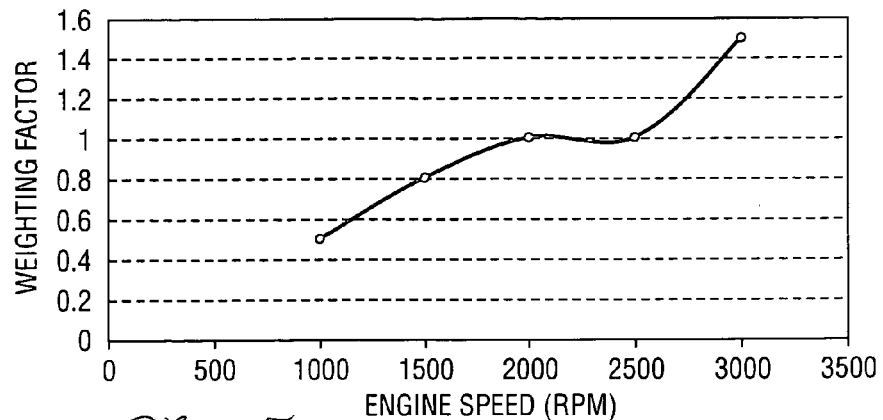
Fig. 5
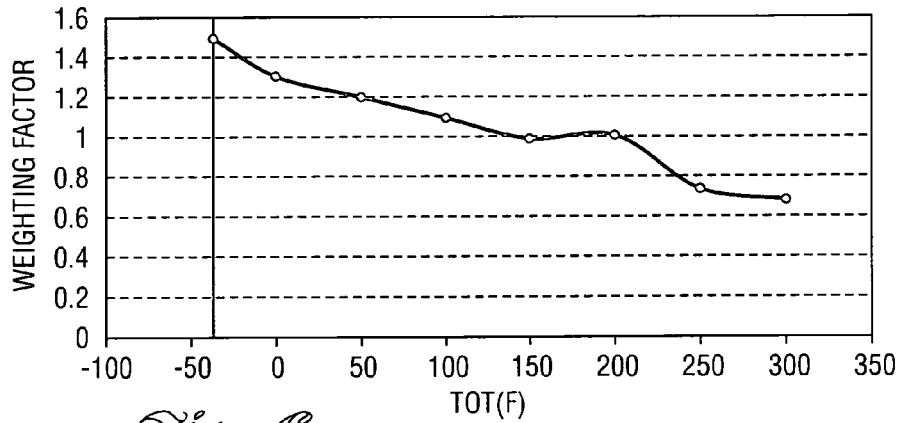
Fig. 6
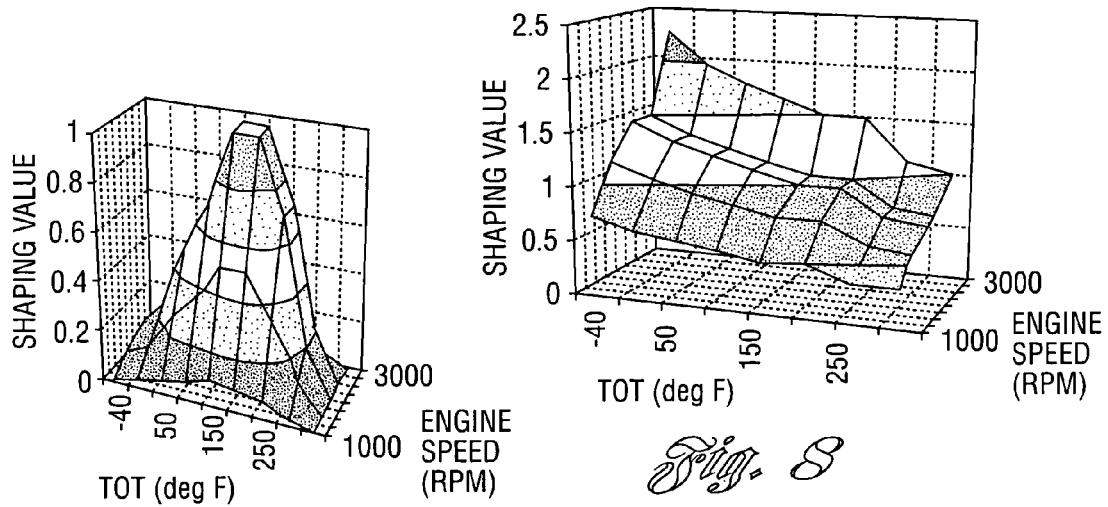
Fig. 7
Fig. 8

METHOD FOR RAPID DATA TABLE INITIALIZATION

BACKGROUND OF INVENTION

1. Field of the Invention

The present invention relates to a method for rapid data table initialization.

2. Background Art

To improve performance, many control systems employ adaptive algorithms to account for hardware variability and aging. These algorithms typically measure various inputs and outputs of the control system and provide corrections for any detected errors. One approach is to measure a given event—e.g., a shift in an automatic transmission—calculate the necessary adjustments, and store the adjustments in memory for use the next time the same event is encountered. Such corrections may be stored in data tables that are a function of the system operating conditions. The data tables can be stored in a keep alive memory (KAM) for future use.

One problem of this approach is that it takes a long time to fully populate the entire data table. This problem may be more pronounced if an event happens infrequently, such as an upshift of a transmission. There are several reasons for this. For example, some methods for providing data to an adaptive data table use a four-point interpolation scheme, wherein at most four cells in the data table receive data for any given event. Specifically, a first data cell corresponding to current system conditions receives data directly based on the event. This data is then interpolated and provided to each of the four data cells adjacent to the first data cell. Thus, a data table containing a large number of data cells, corresponding to a wide variety of system conditions, will take a long time to become populated with data.

Another reason that some data tables take a long time to become fully populated, is because some of the data cells represent system operating conditions which occur very infrequently. In such cases, some sections of the data table may receive data many times before other sections are even initialized with a first data input. In these types of data population schemes, data in a cell is often overwritten each time an event occurs at conditions corresponding to the data cell or adjacent data cells. Thus, the information previously written into a data cell is not considered; the data cells may receive more accurate information if previous events are considered in conjunction with a new event when providing data to the table. In addition, for data tables that reside in a KAM, the tables must be repopulated each time the KAM is cleared—e.g., when the power supply to the KAM is disconnected.

Therefore, a need exists for a method for rapidly providing data to a data table even in portions of the table that represent infrequently occurring system operating conditions, and that does not overwrite existing data in the data cells, but rather, makes adjustments to the existing data based on previous events and current events.

SUMMARY OF INVENTION

Accordingly, the invention provides a method for providing data for a data table and a controller configured to process data from a system. The data table has a plurality of cells, each of the data cells being defined by a row and a column in the data table. The method includes measuring a system parameter value. An error based on the difference between a predetermined value and the measured parameter value is determined. A value is read from a first data cell in the data table; the first data cell corresponds to current system conditions. Respective target values for at least some data cells in the data table are determined. The at least some data cells include the first data cell. Each of the respective target values are a function of at least the determined error and the value read from the first data cell. Data values in the at least some data cells are selectively modified based on the respective target values.

The invention also provides a method for providing data for a data table and a controller configured to process data from a system. The data table has a plurality of cells, each of which are defined by a row and a column in the data table. The method includes measuring a system parameter value. An error based on the difference between a predetermined value and the measured parameter is determined. Respective target values for at least some data cells in the data table are determined. The at least some data cells include a first data cell corresponding to current system conditions, and at least one additional data cell not adjacent to the first data cell. The respective target values are a function of at least the determined error. Data values in the at least some data cells are selectively modified based on the respective target values.

The invention further provides a controller configured to process data from a system. The controller has a resident data table including a plurality of data cells; each of the data cells is defined by a row and a column in the data table. The controller includes an algorithm for providing data for the data table. The algorithm includes instructions for determining an error based on the difference between a measured system parameter value and a predetermined value, determining respective target values for at least some data cells in the data table, and selectively modifying data values in the at least some data cells based on the respective target values. The predetermined value is related to current system conditions, and each of the respective target values is a function of at least the determined error and a value read from a first data cell.

BRIEF DESCRIPTION OF DRAWINGS

FIG. 5 is a graph illustrating a shaping function for one axis of the data table shown in FIG. 2;

FIG. 6 is a graph showing a shaping function for the other axis of the data table shown in FIG. 2;

FIG. 7 is an example of a shaping function using a probability estimate; and

FIG. 8 is an example of a shaping function using an error estimate.

DETAILED DESCRIPTION

Figure 1:
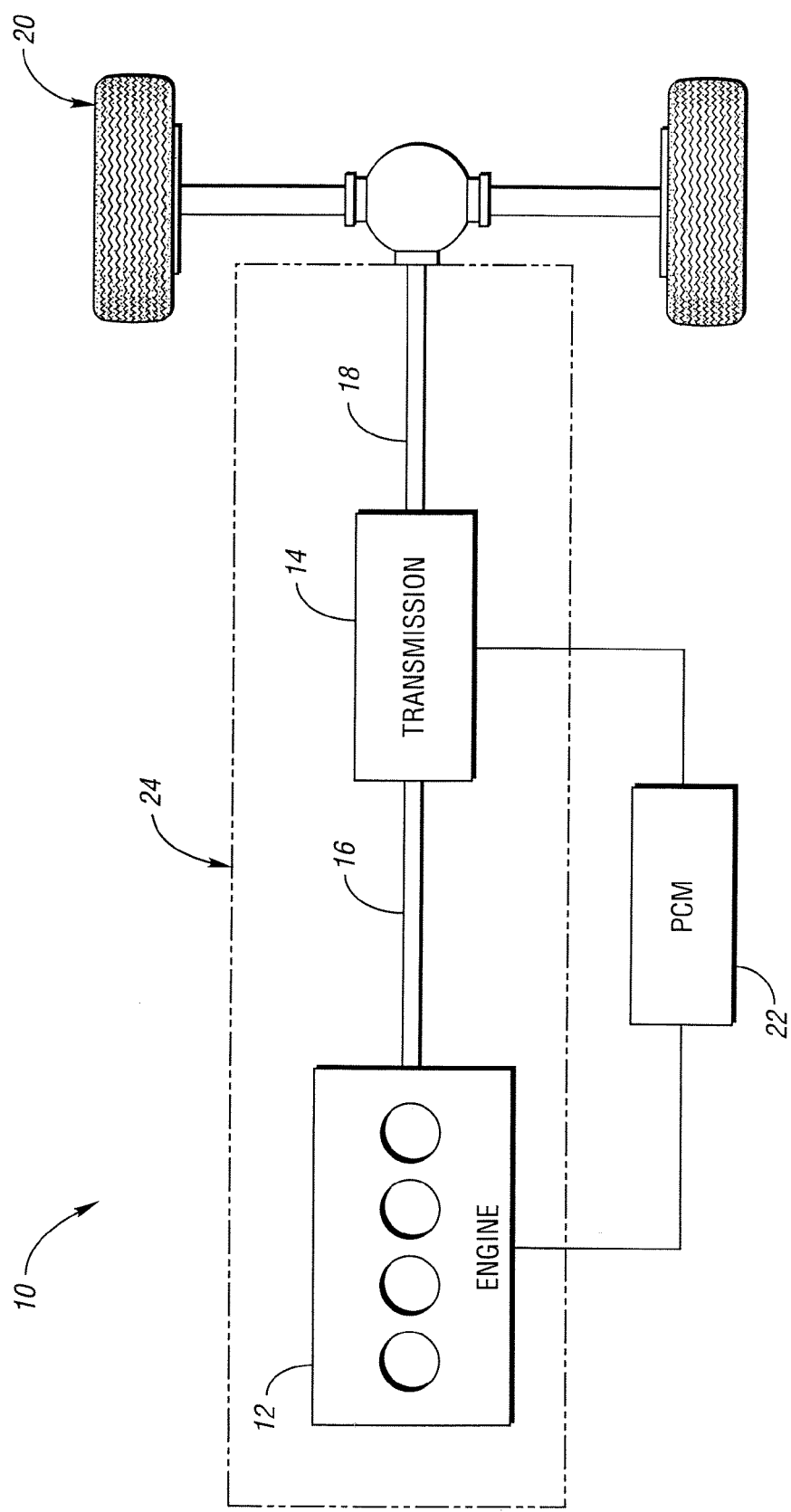
FIG. 1 is a simple schematic representation of a vehicle including a controller programmed in accordance with the present invention.

FIG. 1 shows a portion of a vehicle 10, including an engine 12 connected to a transmission 14 through a transmission input shaft 16. A transmission output shaft 18 connects the transmission 14 to the vehicle wheels 20. A controller, or powertrain control module (PCM) 22, is in communication with both the engine 12 and the transmission 14, and helps to control both of these devices. In the embodiment shown in FIG. 1, the PCM 22 is connected directly to the engine 12 and the transmission 14; however, other configurations are possible. For example, an engine control module (not shown) may be disposed between the engine 12 and the PCM 22 for controlling the engine 12, and for transferring data to and from the PCM 22. Similarly, a transmission control module (not shown) can be disposed between the transmission 14 and the PCM 22.

Collectively, the engine 12, the transmission 14, and the input and output shafts 16, 18 may be referred to as the vehicle powertrain 24. The PCM 22 is configured to process data from the powertrain 24, including inputs from the engine 12 and the transmission 14. The PCM 22 includes a resident data table 26, which is graphically illustrated in FIG. 2. The data table 26 includes a plurality of data cells, which may be conveniently referenced according to a row and a column. The five columns in the data table 26 are numbered 0–4, respectively, each of the integers representing a normalized engine speed. Similarly, each of the seven rows in the data table 26 are labeled 0–6, respectively, and represent a normalized transmission oil temperature (TOT). Shown opposite the normalized engine speed is the actual engine speed, ranging from 1000 to 3000 revolutions per minute (RPM). Similarly, the actual TOT is given opposite the normalized TOT, and ranges from 0° to 300° F.

Figure 2:
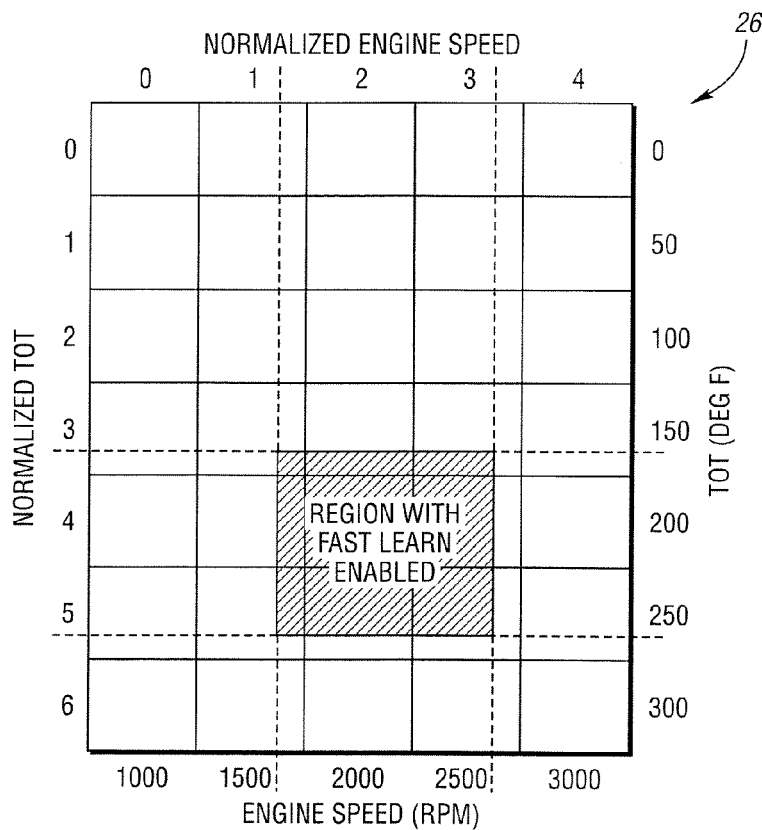
FIG. 2 is an illustration of a data table programmed into the controller shown in FIG. 1.

The data table 26 shown in FIG. 2 represents only a portion of a larger data table which covers a broader range of operating conditions for the engine 12 and the transmission 14. For any given set of operating conditions, which includes an engine speed and a TOT, there exists a corresponding data cell in the data table 26. Data tables, such as the data table 26, can be used to store a variety of information, such as different parameter values for a device or system. For example, the data table 26 is configured to store information relating to the transmission oil pressure at various combinations of engine speed and TOT. In particular, the data table 26 is an adaptive data table, where the pressure data is used to adapt the operation of the transmission 14 so that actual transmission oil pressure more closely resembles a theoretical ideal.

Although the data table 26 is specifically configured to contain adaptive data for the transmission 14, the present invention can be used with other data tables, including those configured with different parameter values for other devices and/or systems. In addition, the transmission oil pressure, or some other parameter, may be related to various combinations of torque and transmission output shaft speed, rather than TOT and engine speed. Thus, the present invention is applicable to many different types of data tables.

Figure 3:
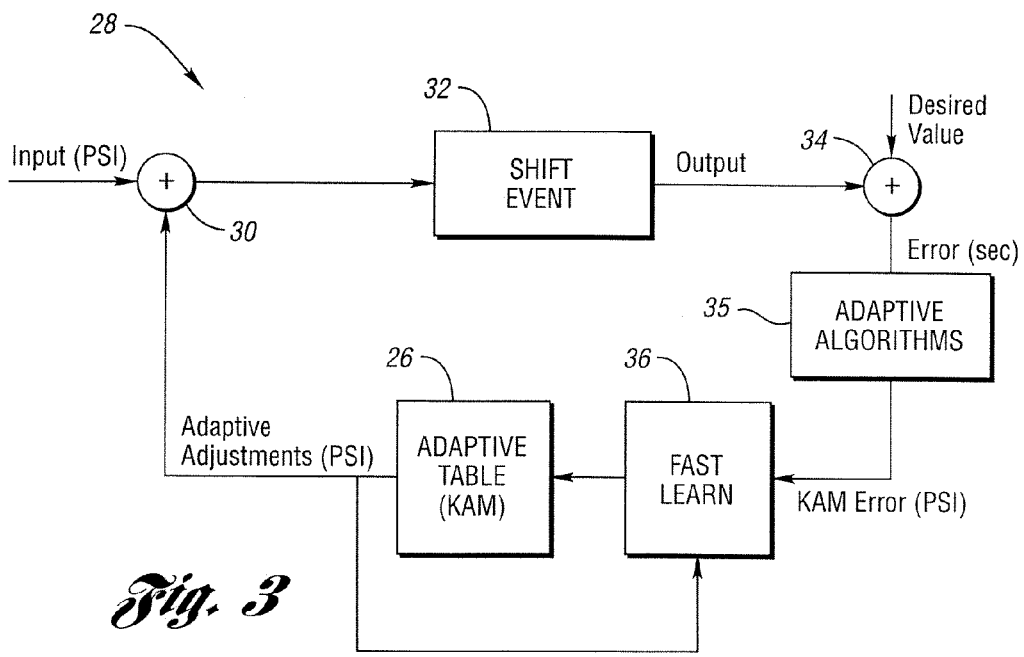
FIG. 3 is a feedback control loop illustrating a method in accordance with the present invention.

The data cells in the data table 26 can be filled with data in a number of different ways. FIG. 3 shows a feedback control diagram 28 which illustrates one method for providing data to a data table, such as the data table 26. Initially, an input of transmission oil pressure in pounds per square inch (PSI) is provided to a summing junction 30. Also added at the summing junction 30 is an adaptive adjustment provided from the feedback portion of the control loop 28. If there is no data in a data table 26 which relates to the current operating conditions—i.e., the current engine speed and the current TOT—then the adaptive adjustment is zero.

Next, a shift event occurs in the transmission 14, as illustrated in block 32. Such an event may be an upshift, downshift, or a shift between a forward gear and a reverse gear. After the shift event, an output value is compared to a predetermined, or desired, value at a summing junction 34. The output value is a system parameter value that is determined by measuring the time it took for the shift event to occur. The difference between the measured output value and the desired value is the error, which may be measured in seconds. Of course, other shift event errors can be measured—e.g., engine speed, which may be indicative of an engine flare or tie up, the time to start a shift, or the duration of any portion of a shift, just to name a few.

Because the input into the summing junction 30 is a transmission oil pressure, an adaptive algorithm or algorithms are applied to the error to transform it from a time to a pressure value—see control block 35. Because the data table 26 resides in KAM located in the PCM 22, the adaptive algorithms transform the error into a KAM error, measured in PSI. At this point, the KAM error could be fed directly into the data table 26, occupying a first data cell that corresponds to the system conditions when the shift event occurred. From there, a number of data cells directly adjacent to the first data cell could be populated based on interpolation of the data in the first data cell. Alternatively, a fast learn method, explained in more detail below, can be used to populate some or all of the data table 26 based in part on the KAM error.

The fast learn algorithm is illustrated schematically in control block 36 in FIG. 3. After the fast learn algorithm is applied, the data table 26 is populated with data values. The output from the data table 26 is the adaptive adjustment, which is fed back into the fast learn algorithm, and also fed forward into the summing junction 30, as explained above.

Figure 4A:
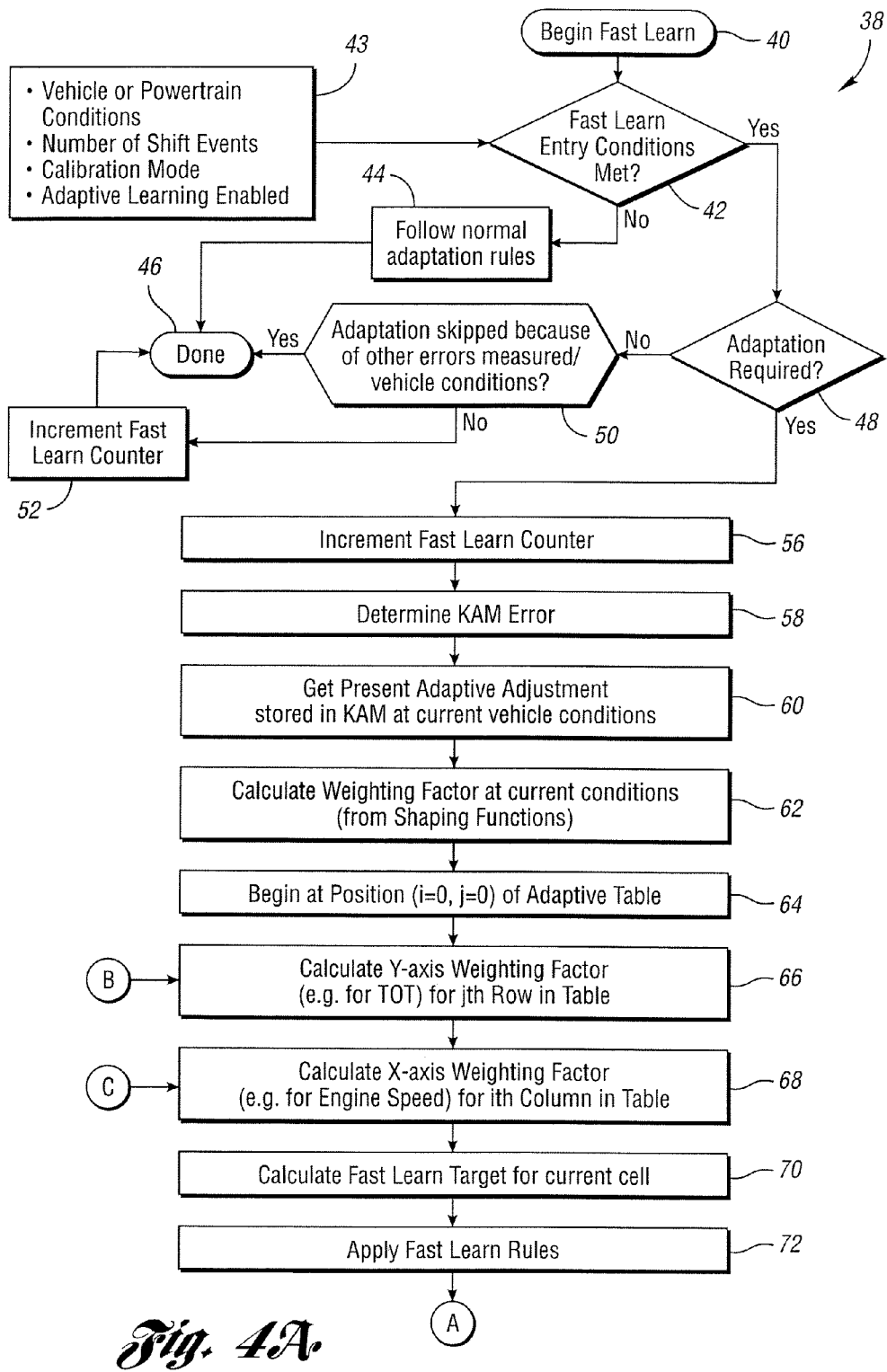
FIGS. 4A and 4B are a detailed flow chart illustrating the steps of a method in accordance with the present invention.
Figure 4B:
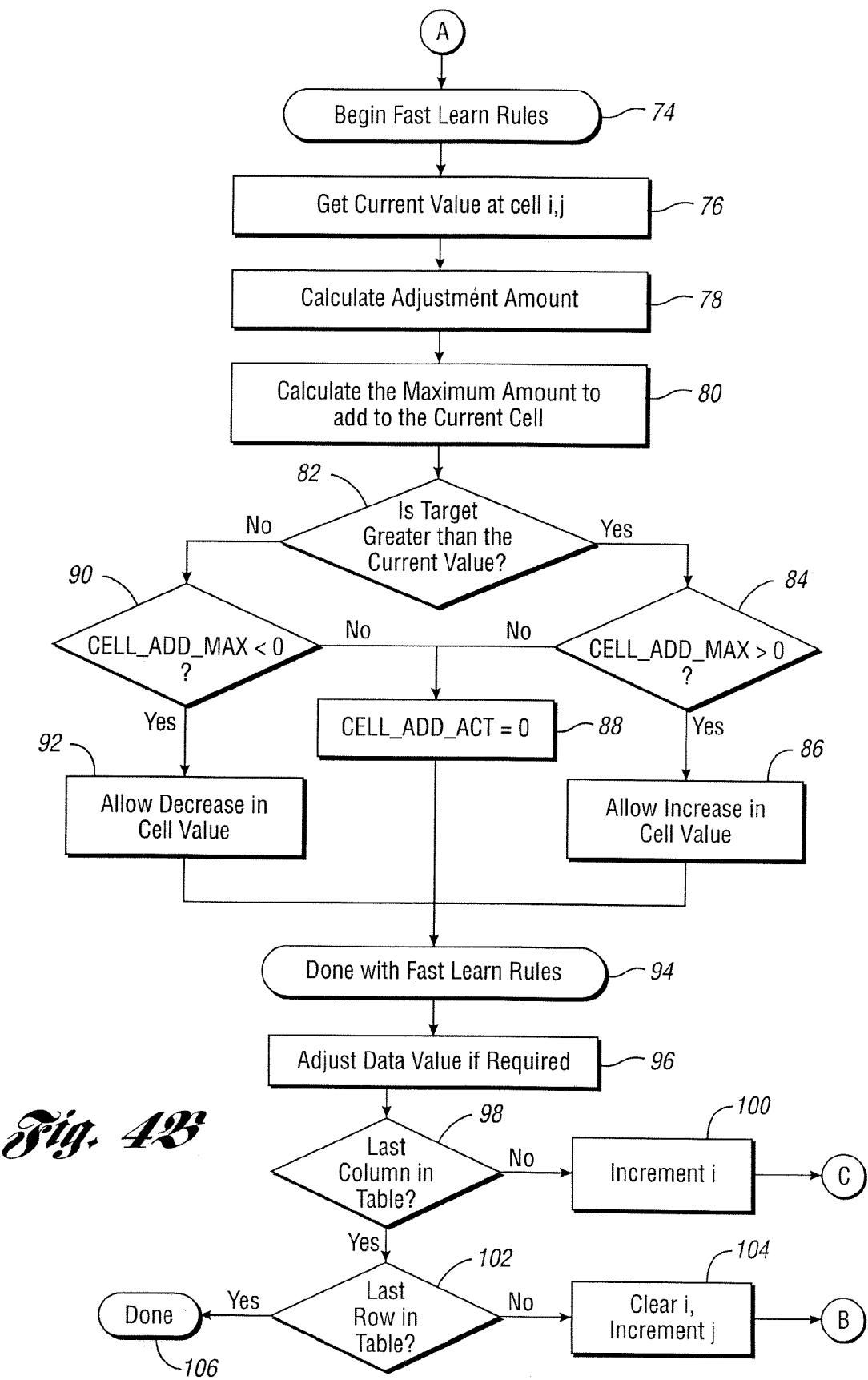

FIG. 4 shows a detailed flow chart 38 illustrating the steps involved in a method applying the fast learn algorithm referenced in control block 36 in FIG. 3. The fast learn algorithm begins at step 40; then at decision block 42, it is determined whether the fast learn entry conditions are met. The fast learn entry conditions are input from block 43, which illustrates just some of the conditions that can be used. For example, various vehicle and/or powertrain conditions can be used, such that one or more conditions need to match corresponding predetermined conditions before the fast learn algorithm is used.

In addition to the vehicle and/or powertrain conditions, the total number of shift events can be examined. This helps to ensure that the fast learn algorithm is not employed if a large portion of the table is already filled with information from many shift events. The fast learn algorithm can be turned off/on via calibration, and is only active if the adaptive learning algorithm—see FIG. 3, block 35—is enabled.

One purpose of such entry conditions is to use the fast learn algorithm only under conditions where the errors measured have the highest probability of being predictable—i.e., conditions that apply to most operating ranges. For example, the fast learn algorithm may be prevented at very cold temperatures where many of the errors measured will have no correlation to the errors seen at warmer, more frequently encountered conditions.

The data table in FIG. 2 includes a hatched area which represents the region where the fast learn algorithm is enabled. Specifically, the engine speed must be within a predetermined speed range, and the TOT must be within a predetermined temperature range before the fast learn algorithm will be applied. When a shift event takes place outside the hatched region, a "normal learning" algorithm will be used, wherein control block 36 is removed from the control loop 28, shown in FIG. 3. Thus, normal learning will take place and the fast learn algorithm is done—see steps 44, 46 in FIG. 4. Of course, the fast learn enabled region may be expanded or contracted, as desired. Moreover, a single system condition could be compared to a predetermined condition to determine whether data values should be modified by application of the fast learn algorithm.

If the fast learn entry conditions are met, the next inquiry is whether adaptation is required—see decision block 48. This comes from the output of the adaptive algorithms-see FIG. 3, block 35—based on the errors measured during the shift. If it is determined that adaptation is not required, another inquiry is made at decision block 50, as to why the adaptation was skipped. If the adaptation was skipped because other errors were measured, the fast learn algorithm is done—see step 46. Similarly, if the adaptation was skipped because of vehicle conditions, such as the vehicle operating in traction control, the fast learn algorithm ends. If, however, the adaptation was skipped for other reasons—e.g., if the difference between the output value and the desired value was negligible, making the error almost zero—a fast learn counter is incremented—see step 52. Incrementing a fast learn counter under these conditions prevents a vehicle with no errors from staying in the fast learn mode for longer than desired. After the fast learn counter is incremented, the fast learn algorithm is done—see step 46.

When it is determined at decision block 48 that adaptation is required, the fast learn counter is also incremented-see step 56. In step 58, the KAM error is determined by applying the adaptive algorithms shown in control block 35 in FIG. 3. Next, a value is read from a first data cell in the data table 26, where the first data cell corresponds to current system conditions. Specifically, this means that the adaptive adjustment is retrieved from the data table 26, and it is made available to the fast learn algorithm. This is graphically illustrated in the second feedback loop shown in FIG. 3, and represented at step 60 shown in FIG. 4.

In order to accurately fill data cells using only a single calculated value, a respective weighting factor is used for each of the cells that receive data. The weighting factors may be viewed as part of a shaping function—i.e., a function used to shape the data from the first data cell to more accurately fit the conditions of a data cell located in some other portion of the data table 26. For example, a shaping function may be an estimate of the errors over all of the operating conditions based on what is measured at current operating conditions. For example, a 2 PSI error at 180° F. and 1000 RPM may be equivalent to a 4 PSI error at 0° F. and 2000 RPM. Thus, the data from the first data cell—i.e., 2 PSI—has some shaping function applied to it to transform it into a 4 PSI value for conditions of 0° F. and 2000 RPM. This type of shaping function may be determined empirically by comparing various outputs over a variety of system operating conditions.

Another way to specify a shaping function is as an estimate of the probability that an error measured inside the fast learn region—see the hatched area in the data table shown in FIG. 2—applies to conditions outside of the region. For example, a 2 PSI error at 180° F. and 1000 RPM may only have a 50% probability of applying to a cell at 0° F. and 2000 RPM. Again, empirically gathered data may be used to estimate the probabilities that data within the fast learn region applies to data cells outside the region.

One way to specify a weighting factor for each cell is to specify a weighting value for each axis. Thus, the X-axis of the data table 26, represented by the engine speed, may have a different weighting factor for each column, or each engine speed—see FIG. 5. Similarly, the Y-axis of the data table 26, represented by the TOT, may have a different weighting factor for each row, or each TOT value—see FIG. 6. The weighting factor for any given cell is the product of the weighting factor for the row and the column defining the cell. Such a product yields a three-dimensional shaping function, the shape of which is dependent upon which method was used to specify the weighting factors. For example, if the probability estimate for the weighting factors described above is used, a shaping function resembling a three-dimensional bell curve may be the result—see FIG. 7. Alternatively, if the first method of specifying the shaping function is used, a three-dimensional surface plot, such as shown in FIG. 8, may be the result. The processes involved in these calculations are illustrated in a number of steps shown in the flow chart in FIG. 4.

First, the weighting factor at current system operating conditions is determined from the shaping function being used—see step 62. This value, known as the gain, will be used later in the algorithm to calculate a respective target value for each of the data cells being filled. To identify each of the data cells in the data table 26, the algorithm uses (i) and (j) notation. In particular, (i) represents a column number and (j) represents a row number. The fast learn algorithm begins to provide data to the first data cell (i=0, j=0) of the data table 26—see step 64.

Next, at steps 66, 68 the Y-axis weighting factor and the X-axis weighting factor are respectively calculated. When these have been determined for a given cell, a respective target value for that cell can be determined. The cell target is defined by the following equation:

$$\text{CELL\_TARGET}_{i,j} = (C+E)(W_j \cdot W_i)/G \qquad \text{Eq. 1}$$

where $\text{CELL\_TARGET}_{i,j}$ is the respective target value for a cell at column (i), row (j), where (i) and (j) are integers; C is the current value read from the first data cell; E is the determined error; $W_i$ is the weighting factor for column (i); $W_j$ is the weighting factor for row (j); and G is the gain, or weighting factor for the first data cell. This process is shown in step 70.

As seen in Equation 1, the target values are a function of a number of variables, including the value read from the first data cell. This means that when a target value is calculated for the first data cell, the existing data in that cell is taken into consideration when the target value is calculated. In this way, data that has been previously written into a data cell is not ignored; rather, existing data is considered when the target value is calculated, which may further increase the accuracy of the data written into the data cell. This provides an improvement over algorithms which calculate new values for data cells based on current events, without considering the data already gathered from past events.

Before the target value for a given cell is written to the data table 26, a number of fast learn rules are applied; this is shown generally at step 72. When the fast learn rules begin, as shown in step 74, the data value, or current value of the data cell is retrieved—see step 76. An adjustment amount for the respective data cell is then calculated. The adjustment amount is defined as the difference between the target value for the respective data cell and the data value in that cell. This calculation takes place at step 78. Next, at step 80, a maximum adjustment for the data value in the data cell is calculated. Although the maximum adjustment for a data cell may be calculated in a number of different ways, one way is to define the maximum adjustment by the following equation:

$$\text{MAX\_ADJ}_{i,j} = E \cdot W_j \cdot W_i \qquad \text{Eq. 2}$$

where E is the determined error; $W_i$ is the weighting factor for column (i); and $W_j$ is the weighting factor for row (j), where (i) and (j) are integers.

The next inquiry, at decision block 82, is whether the target value for the given data cell is greater than the data value already in the cell. Another way to view this is to ask whether the adjustment amount for the data cell is positive. If the answer is yes, the next question is whether the maximum adjustment is also positive—see decision block 84. If the answer is yes, then both the adjustment amount and the maximum adjustment have the same sign—i.e., they are both positive. In this case, the data value in the data cell is increased toward the target value, being limited by the lesser of the adjustment amount and the maximum adjustment—see step 86. Conversely, if the calculated value of the maximum adjustment is negative, the data value in the data cell is not adjusted—see step 88.

When the target value is less than the current value in the data cell—see decision block 82—the adjustment amount is negative; this leads to decision block 90. Here it is determined whether the maximum adjustment is also negative. If the answer is yes, this means that the adjustment amount and the maximum adjustment each have the same sign, and the method continues to step 92. Here, the data value in the data cell is decreased in the direction of the target value, but is limited by the lesser in magnitude of the adjustment amount and the maximum adjustment. This means the data value will be adjusted all the way to the target value, unless the maximum adjustment would be exceeded, in which case, the adjustment is limited to the amount of the maximum adjustment. If, however, the maximum adjustment is positive, the adjustment amount and the maximum adjustment have opposite signs and no adjustment is made to the value in the data cell—see step 88. At this point, the fast learn rules are complete—see step 94.

Because the algorithm described above is applied to more than one of the data cells in the data table 26, a loop is inserted into the algorithm to apply the steps to additional cells. At step 96, the data value in the cell is adjusted, if required, based on steps 82–92. Next, at decision block 98, it is determined whether the algorithm was applied to the last column in the data table 26. If not, step 100 increments the column number by one, and the algorithm returns to step 68. The next inquiry is whether the algorithm has been applied to the last row in the data table 26—see decision block 102. If the answer is no, the column number is cleared, and the row number is incremented by one—see step 104. The algorithm then returns to step 66. If, however, the algorithm has been applied to the last column and the last row in the data table 26, the algorithm is complete at step 106.

While the best mode for carrying out the invention has been described in detail, those familiar with the art to which this invention relates will recognize various alternative designs and embodiments for practicing the invention as defined by the following claims.

The invention claimed is:

1. A method for providing data for a data table in a controller configured to process data from a system having at least one parameter with a value that can be measured, the data table having a plurality of data cells, each of the data cells being defined by a row and a column in the data table, the method comprising:
   measuring a value of a parameter of the system;
   determining an error based on the difference between a predetermined value and the measured parameter value;
   reading a value from a first data cell in the data table, the first data cell corresponding to current conditions of the system;
   determining respective target values for at least some data cells in the data table, the at least some data cells including the first data cell, each of the respective target values being a function of at least the determined error and the value read from the first data cell; and
   selectively modifying data values in the at least some data cells based on the respective target values.

2. The method of claim 1, further comprising:
   determining a respective adjustment amount for each of the data values in the at least some data cells, each of the respective adjustment amounts being defined as the difference between a respective target value and a data value in a data cell;
   determining a respective maximum adjustment for each of the data values in the at least some data cells; and
   wherein selectively modifying data values in the at least some data cells includes adjusting a cell value toward a respective target value when the respective adjustment amount and the respective maximum adjustment have the same sign, the adjustment being limited by the lesser in magnitude of the respective adjustment amount and the respective maximum adjustment.

3. The method of claim 2, wherein selectively modifying data values in the at least some data cells includes making no adjustment to a data cell value when the respective adjustment amount and the respective maximum adjustment have opposite signs.

4. The method of claim 1, further comprising:
   determining a respective weighting factor for each of the at least some data cells; and
   wherein each of the respective target values are a function of at least the determined error, the value read from the first data cell, a respective weighting factor, and the weighting factor of the first data cell.

5. The method of claim 4, wherein each row in the data table has a respective row weighting factor, each column in the data table has a respective column weighting factor, and each of the respective weighting factors for the at least some data cells is defined as the product of a respective row weighting factor and a respective column weighting factor.

6. The method of claim 5, wherein the respective target values are defined by:
   $\text{CELL\_TARGET}_{i,j} = (C+E)(W_j \cdot W_i)/G$, where $\text{CELL\_TARGET}_{i,j}$ is the respective target value for a cell at column (i), row (j), where (i) and (j) are integers; C is the value read from the first data cell; E is the determined error; $W_i$ is the weighting factor for column (i); $W_j$ is the weighting factor for row (j); and G is the gain, or weighting factor for the first data cell.

7. The method of claim 1, further comprising:
   comparing at least one current system condition to a respective predetermined condition; and
   selectively modifying data values in the at least some data cells only when the at least one current system condition matches the respective predetermined condition.

8. The method of claim 7, the system including a powertrain in a vehicle, the powertrain including an engine and a transmission having transmission oil, wherein the at least one current system condition includes a speed of the engine and a temperature of the transmission oil, and wherein the data values in the at least some data cells are selectively modified only when the engine speed is within a predetermined speed range and the transmission oil temperature is within a predetermined temperature range.

9. A method for providing data for a data table in a controller configured to process data from a system having at least one parameter with a value that can be measured, the data table having a plurality of data cells, each of the data cells being defined by a row and a column in the data table, the method comprising:

measuring a value of a parameter of the system;

determining an error based on the difference between a predetermined value and the measured parameter value;

determining respective target values for at least some data cells in the data table, the at least some data cells including a first data cell corresponding to current conditions of the system, and at least one additional data cell not adjacent to the first data cell, the respective target values being a function of at least the determined error; and selectively modifying data values in the at least some data cells based on the respective target values.

10. The method of claim 9, further comprising:

determining a respective adjustment amount for each of the data values in the at least some data cells, each of the respective adjustment amounts being defined as the difference between a data value in a data cell and a respective target value;

determining a respective maximum adjustment for each of the data values in the at least some data cells; and wherein selectively modifying data values in the at least some data cells includes adjusting a cell value toward a respective target value when the respective adjustment amount and the respective maximum adjustment have the same sign, the adjustment being limited by the lesser in magnitude of the respective adjustment amount and the respective maximum adjustment.

11. The method of claim 10, wherein selectively modifying data values in the at least some data cells includes making no adjustment to a data cell value when the respective adjustment amount and the respective maximum adjustment have opposite signs.

12. The method of claim 10, further comprising:

determining a respective weighting factor for each of the at least some data cells; and wherein each of the respective target values are a function of at least the determined error, a respective weighting factor, and the weighting factor of the first cell.

13. The method of claim 12, wherein each row in the data table has a respective row weighting factor, each column in the data table has a respective column weighting factor, and each of the respective weighting factors for the at least some data cells is defined as the product of a respective row weighting factor and a respective column weighting factor.

14. The method of claim 13, wherein the respective maximum adjustments are defined by:

$MAX\_ADJ_{i,j} = E \cdot W_j \cdot W_i$, where E is the determined error; $W_i$ is the weighting factor for column (i); and $W_j$ is the weighting factor for row (j), where (i) and (j) are integers.

15. The method of claim 13, further comprising:

reading a value from the first data cell; and wherein each of the respective target values are a function of at least the determined error, the value read from the first data cell, a respective weighting factor, and the weighting factor of the first data cell.

16. The method of claim 15, wherein the respective target values are defined by:

$CELL\_TARGET_{i,j} = (C+E)(W_j \cdot W_i)/G$, where $CELL\_TARGET_{i,j}$ is the respective target value for a cell at column (i), row (j), where (i) and (j) are integers; C is the value read from the first data cell; E is the determined error; $W_i$ is the weighting factor for column (i); $W_j$ is the weighting factor for row (j); and G is the gain, or weighting factor for the first data cell.

17. The method of claim 9, further comprising:

comparing at least one current system condition to a respective predetermined condition; and selectively modifying data values in the at least some data cells only when the at least one current system condition matches the respective predetermined condition.

18. The method of claim 17, the system including a powertrain in a vehicle, the powertrain including an engine and a transmission having transmission oil, wherein the at least one current system condition includes a speed of the engine and a temperature of the transmission oil, and wherein the data values in the at least some data cells are selectively modified only when the engine speed is within a predetermined speed range and the transmission oil temperature is within a predetermined temperature range.

19. A controller configured to process data from a system having at least one parameter with a value that can be measured, the controller having a resident data table including a plurality of data cells, each of the data cells being defined by a row and a column in the data table, the controller comprising:

an algorithm for providing data for the data table, the algorithm including instructions for determining an error based on the difference between a measured value of a parameter of the system and a predetermined value, determining respective target values for at least some data cells in the data table, and selectively modifying data values in the at least some data cells based on the respective target values, the predetermined value being related to current conditions of the system, and each of the respective target values being a function of at least the determined error and a value read from a first of the data cells.

20. The controller of claim 19, the system including a powertrain in a vehicle, the powertrain including an engine and a transmission having transmission oil, wherein the measured parameter value is a transmission shift time, and the current system conditions include a speed of the engine and a temperature of the transmission oil.

21. The controller of claim 20, wherein the algorithm further includes instructions for selectively modifying data values in the at least some data cells only when the engine speed is within a predetermined speed range and the transmission oil temperature is within a predetermined temperature range.

22. The controller of claim 19, further comprising a keep alive memory, and wherein the data table resides in the keep alive memory.

23. The controller of claim 19, wherein the at least some data cells include the first data cell and at least one additional data cell not adjacent to the first data cell.

24. The controller of claim 19, wherein the algorithm further includes instructions for determining a respective weighting factor for each of the at least some data cells; and wherein each of the respective target values are a function of at least the determined error, the value from the first data cell, a respective weighting factor, and the weighting factor of the first data cell.

25. The controller of claim 19, wherein the algorithm further includes instructions for the following steps, determining a respective adjustment amount for each of the data values in the at least some data cells, each of the respective adjustment amounts being defined as the difference between a data value in a data cell and a respective target value;

determining a respective maximum adjustment for each of the data values in the at least some data cells; and wherein selectively modifying data values in the at least some data cells includes adjusting a cell value toward a respective target value when the respective adjustment amount and the respective maximum adjustment have the same sign, the adjustment being limited by the lesser in magnitude of the respective adjustment amount and the respective maximum adjustment.

26. The controller of claim 19, wherein selectively modifying data values in the at least some data cells includes making no adjustment to a data cell value when the respective adjustment amount and the respective maximum adjustment have opposite signs.

* * * * *